Patented Aug. 20, 1940

2,212,107

UNITED STATES PATENT OFFICE 2,212,107

PROCESS FOR REMOVING ACID COMPONENTS FROM HYDROCARBON DISTILLATES

David Louis Yabroff, Berkeley, Calif., assignor to Shell Development Company, San Francisco, Calif., a corporation of Delaware No Drawing. Application February 7, 1939,
Serial No. 255,105

7 Claims. (Cl. 196—32)

This invention is a continuation-in-part of my co-pending application Serial No. 102,893, filed September 28, 1936, which has issued as U. S. Patent 2,152,166, March 28, 1939, and deals with the removal of weakly acid reacting organic substances from solutions in certain water-insoluble organic liquids by extraction with aqueous solutions of caustic alkali containing a solubility promoter for these substances, and more particularly deals with the removal of mercaptans from hydrocarbon distillates.

It is frequently necessary to eliminate small quantities of organic relatively weak acid reacting components such as mercaptans, phenols, thiophenols, alkyl phenols, fatty acids, etc., from their solutions in neutral or weakly basic reacting organic liquids which are substantially immiscible with water such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitrogen containing hydrocarbons such as amyl or higher amines, aniline, water-insoluble pyridine derivatives, petroleum bases, etc.

In order that the water-insoluble organic liquids may be treated by my process, they must be substantially inert and resistant to chemical reaction with strong aqueous solutions of caustic alkali when contacted therewith for short periods of time, e. g., about 10 minutes or less at normal room temperatures.

My invention comprises extracting organic acids which are difficult to extract, such as the weak acids having dissociation constants lower than those of fatty acids, e. g., mercaptans, phenols, etc., contained in water-insoluble organic liquids which are substantially inert toward strong aqueous caustic alkali solutions at normal room temperatures, with an aqueous solution of caustic alkali in which is dissolved a substantial amount of a solubility promoter for weak organic acids, under conditions to absorb at least a major portion of the weak organic acids in the aqueous solution, and to form two layers and separating the layers.

In the application Serial No. 102,893, filed September 28, 1936, I have disclosed that certain polar substances which are at least partly miscible with aqueous solutions of strong caustic alkali, promote the solvent power for weak organic acids of aqueous caustic alkali solutions in which they are dissolved. I have shown that among other compounds, certain alkyl glycerols are highly effective in the matter of promoting the solubility of weak organic acids such as mercaptans, phenols, etc., in aqueous caustic alkali solutions. According to the present invention, I use alkyl glycerols in which the total number of carbon atoms in the alkyl radicals is from 2 to 4. Examples of such alkyl glycerols are mono ethyl glycerol, mono propyl glycerol, mono butyl glycerol, dimethyl glycerol, methyl ethyl glycerol, trimethyl glycerol, tetramethyl glycerol, etc.

Aqueous solutions of various caustic alkalis may be used. The alkali metal hydroxides are most useful and effective, although ammonia, alkaline earth hydroxides, quaternary ammonium bases, alkali metal carbonates, etc., may also be suitable.

The concentration of the aqueous caustic alkali may vary within wide limits. In general, I prefer to use caustic alkali solutions which are above about 2 normal and preferably between 4 to 10 normal, calculated on the total solution, although higher and lower concentrations may be used.

Concentration of the alkyl glycerol in the aqueous solution should preferably be between about 25% and 75%. Moreover, the amount of water in the solution should be not less than 15% and not more than 70%, preferably not more than 50%. The presence of water in the above amount is highly desirable because otherwise the regeneration by steam stripping of spent alkaline solution containing solubility promoter and absorbed weak organic acids is extremely difficult. Thus steam consumption is greatly reduced by the presence of the preferred amounts of water, while on the other hand, the extraction efficiency for the weak acids need not be reduced materially. The presence of amounts of water greater than 15% does not cause a substantial hydrolysis of dissolved alkali salts of the weak organic acids as has been supposed by earlier investigators, the hydrolysis being largely a function of the alkalinity of the aqueous solution.

While increasing the amount of water may have the additional advantage of reducing losses of the alkyl glycerol due to its being dissolved in the organic liquid, this is a minor consideration when treating hydrocarbon liquids, because these alkyl glycerols are substantially insoluble in hydrocarbon liquids even in the presence of amounts of water much smaller than 15%.

Thus, for example, when contacting isoöctane with 20 volume percent of aqueous solutions of alpha-beta dimethyl glycerol or alpha-n-butyl glycerol containing 10% and 15% water, respectively, and analyzing the resulting isoöctane for the glycerols, the following contents of glycerols were found:

| Glycerol | Percent water | Content of glycerol in isoöctane percent |
|---|---|---|
| Dimethyl glycerol | 10 | Less than .01. |
|  | 15 | Do. |
| Butyl glycerol | 10 | .03. |
|  | 15 | .02. |

Alkyl glycerols are far more powerful solubility promoters for weak organic acids than glycerine. In fact, under my conditions, glycerine may lower the extraction efficiency of aqueous alkali metal hydroxide solutions. For example, when treating a solution of normal amyl mercaptan in gasoline with aqueous 2.5 normal caustic soda solutions containing glycerine or certain alkyl glycerols, respectively, the following values for the partition coefficient K were found:

$$K = \frac{\text{concentration of mercaptans in aqueous phase}}{\text{concentration of mercaptans in oil phase}}$$

| Solubility promoter | K value |
|---|---|
| None | 1.6 |
| 50% glycerine | .6 |
| 50% alpha-beta-dimethyl glycerol | 11.3 |
| 50% alpha butyl glycerol | 43.4 |

The temperature of the extraction is preferably kept between 0° and 60° C., the extraction efficiency decreasing with increases in the temperature; and at temperatures below about 0° C. difficulties are frequently encountered due to precipitation of a portion of the solubility promoter and/or excessive viscosity of the aqueous caustic alkali containing the solubility promoter.

The extraction of the organic acids from their solutions in the organic liquids described before may be carried out by simply mixing the solution with a predetermined amount of the aqueous caustic alkali solution in which is dissolved a substantial amount of the alkyl glycerols, and then separating the liquids. The resulting aqueous solution contains most of the alkyl glycerols and the major portion of the organic acids, while the organic liquid stripped from the acids contains a trace of the glycerols. By washing the stripped organic liquid with water, the alkyl glycerols are re-extracted by the latter. The aqueous solution so obtained may then be added to the caustic alkali solution containing the bulk of the glycerols, and excess water may be separated from the resulting solution by distillation.

More thorough extraction may be had, however, in a multi-stage countercurrent extraction system or in a packed tower.

The amount of aqueous caustic alkali solution required in the extraction is normally above about 5% by volume and for economical reasons seldom exceeds about 100% by volume. Normally from about 10% to 50% by volume is used depending upon the required thoroughness of removing the weak organic acids.

Spent aqueous caustic alkali solution containing the alkyl glycerols and weak organic acids may be regenerated by distillation, steaming and/or oxidation, according to well-known principles.

The following example further serves to illustrate my process:

A West Texas straight run full range gasoline containing .1141% mercaptan sulfur was extracted at 20° C. with 10 volume percent of a 2.5 normal aqueous caustic soda solution. 14.6% of the mercaptan sulfur was removed. The same gasoline was then treated under identical conditions with a 2.5 normal aqueous caustic soda solution containing 50% butyl glycerol. 46.3% of the mercaptan sulfur was removed.

I claim as my invention:

1. In the process of separating organic acid reacting substances contained in a water-insoluble neutral or basic organic liquid, the steps comprising treating said liquid with an aqueous solution of a strong base containing a substantial amount of dissolved alkyl glycerol in which the alkyl radicals contain a total number of carbon atoms of 2 to 4, said solution containing from 15% to 70% water, under conditions to absorb at least a portion of said acid reacting substances in said aqueous solution and to form two liquid layers, one comprising the aqueous solution containing absorbed acid reacting substances, and the other consisting essentially of the treated organic liquid, and separating the layers.

2. The process of claim 1 in which the aqueous base solution contains between 25% and 75% of the alkyl glycerol.

3. The process of claim 1 in which the aqueous base is from 2 to 10 normal.

4. The process of claim 1 in which the organic liquid is extracted with 5 to 100 volume percent of aqueous base solution containing the alkyl glycerol.

5. The process of claim 1 in which the base is an alkali metal hydroxide.

6. The process of claim 1 in which the alkyl glycerol is a butyl glycerol.

7. In the process of separating mercaptans contained in a hydrocarbon distillate, the steps comprising treating said distillate with at least 5 volume percent of a 2 to 10 normal aqueous alkali metal hydroxide solution in which is dissolved between 25% and 75% of an alkyl glycerol, the alkyl radicals of which contain a total number of carbon atoms of 2 to 4, said solution containing from 15% to 70% water, under conditions to absorb at least a major portion of the mercaptans in the aqueous solution and to form two liquid layers, one comprising the aqueous alkali metal hydroxide solution containing substantially all of the alkyl glycerol and the major portion of the mercaptans, and the other consisting essentially of treated hydrocarbon distillate, and separating the layers.

DAVID LOUIS YABROFF.